United States Patent [19]
Crosby et al.

[11] Patent Number: 5,933,192
[45] Date of Patent: Aug. 3, 1999

[54] MULTI-CHANNEL DIGITAL VIDEO TRANSMISSION RECEIVER WITH IMPROVED CHANNEL-CHANGING RESPONSE

[75] Inventors: Jeffrey W. Crosby, Sherman Oaks; Michael A. Friedman, Fountain Valley, both of Calif.

[73] Assignee: Hughes Electronics Corporation, El Segundo, Calif.

[21] Appl. No.: 08/877,929

[22] Filed: Jun. 18, 1997

[51] Int. Cl.$^6$ ....................................................... H04N 5/50
[52] U.S. Cl. ............................ 348/387; 348/725; 348/731
[58] Field of Search .................................. 348/10, 11, 13, 348/385, 387, 554, 555, 725, 726, 731–733; 370/436, 478, 345, 343; 455/179.1, 185.1, 186.1, 186.2, 187.1, 191.1; H04N 7/13, 7/08, 5/44, 5/50, 5/455

[56] References Cited

U.S. PATENT DOCUMENTS

| | | | |
|---|---|---|---|
| 4,602,279 | 7/1986 | Freeman | 348/13 |
| 4,903,126 | 2/1990 | Kassatly | 348/385 |
| 4,975,771 | 12/1990 | Kassatly | 348/385 |
| 5,161,023 | 11/1992 | Keenan | 348/732 |
| 5,469,431 | 11/1995 | Wendorf et al. | 370/478 |
| 5,600,378 | 2/1997 | Wasilewski | 348/10 |
| 5,790,177 | 8/1998 | Kassatly | 348/385 |
| 5,861,881 | 1/1999 | Freeman et al. | 348/10 |

*Primary Examiner*—David E. Harvey
*Attorney, Agent, or Firm*—John A. Crook; Michael W. Sales

[57] ABSTRACT

A multi-channel digital video receiver (e.g. DBS) includes a tuning unit with two tuner modules and a decoder unit with two decoder modules. These tuner and decoder units enable the receiver to simultaneously produce decoded video and audio signals for two separately-tuned channels. The signals for the channel currently selected by the user are tuned and decoded by one set of tuner and decoder modules. The decoded signals for the selected channel are sent to an output stage (e.g. encoder), where the signals and their output are encoded for use on an attached presentation device (e.g. television, audio processor, computer, etc.) Simultaneously, a microcontroller predicts the next channel the user will select and causes the other tuner and decoder modules to begin tuning to and decoding the signals for that predicted next channel. A third set of tuner and decoder modules can be added to enable the receiver to begin tuning to and decoding the signals for another likely next channel. Since the receiver begins tuning to the predicted next channel even before a new channel is requested, an expected channel-change command can be processed more quickly than in a conventional receiver.

28 Claims, 3 Drawing Sheets

MULTI-CHANNEL DIGITAL VIDEO TRANSMISSION RECEIVER WITH IMPROVED CHANNEL-CHANGING RESPONSE

BACKGROUND OF THE INVENTION

1. Field of the invention

The invention relates generally to methods and apparatus for receiving and processing multi-channel digital video transmissions, and more particularly to a digital broadcast satellite (DBS) receiver capable of providing quicker response to a user's command to change channels.

2. Description of Related Art

The time required for a conventional multi-channel digital video receiver, such as a DBS receiver, to change channels is comparatively greater than the time needed to change channels in a conventional analog video (e.g. television) system. In either system, reception processing for a selected channel (e.g. program) requires a tuner to tune to the desired carrier frequency and polarity, select the desired packets, and demodulate an otherwise process the selected data before the desired programming can be sent for output (e.g. display).

Formulating a digital DBS broadcast typically requires additional steps. High capacity systems typically utilize signal compression techniques, such as MPEG2 encoding, as well as effective error correction coding. To receive and process these signals, most DBS receivers adjust for the appropriate polarity and frequency of the received satellite transmission, filter and select the required data packets corresponding to the desired output (e.g. channel), and demodulating the channel data (e.g. program or other content). Most DBS systems further enable and lock error-correction circuitry into the new channel before transporting the resulting data packets to a digital decoder. In decoding the video data packets in an MPEG stream, the next complete video frame (I-frame) is generally entered to fill memory buffers before video images are re-encoded to an analog signal for display on the user's screen. In a high-capacity, multiple-channel DBS system, conventional DBS receivers may require several tenths of a second, e.g. from 0.3 to more than 1 second, to change channels.

These delays are particularly annoying to a television user that is sequentially scrolling through adjacent channels, an operation that many users like to perform quickly.

SUMMARY OF THE INVENTION

The multi-channel digital video receiver and method that are the subject of this invention can provide significantly quicker channel changes when a user scrolls through adjacent channels or otherwise selects a predictable new channel.

The receiver includes a tuning unit with two or more tuner modules and a decoder unit with an equal number of decoder modules. These tuning and decoding modules help enable the receiver to simultaneously produce decoded video and audio signals for two or more separately-tuned channels. One tuner module is tuned to the channel currently selected by the user, and its decoded signals are processed for use on the user's presentation device (e.g. television set, computer, audio processor, etc.).

The other tuner module is used to tune to a predicted next channel. While one channel is being processed for use, a microcontroller predicts the next channel likely to be selected and causes the tuning unit to begin tuning to that predicted next channel.

The microcontroller may predict that the user will repeat his or her last channel-change command. Thus, if the currently-selected channel has been selected by a channel-up (or channel-down) command, the microcontroller may predict that the channel above (or below) the currently-selected channel will be the next selected channel. If the currently-selected channel has been selected by a previous-channel command, the microcontroller may predict that the next channel will be the previous channel.

The microcontroller 70 may also predict the next channel based on the user's past actions when watching the current channel. Thus, if channel 201 is currently being processed for use and the user has frequently switched from channel 201 to channel 240 (whether directly or by rapid incremental changes through the intermediate channels without significant "dwell" time, or within a given time window, or otherwise), the microcontroller may predict that the next channel to be selected will be channel 240.

Upon predicting the next channel to be selected, the microcontroller causes the second tuner module to begin tuning to that predicted next channel. Since the receiver begins tuning to the predicted next channel even before a new channel is requested, many of the steps necessary to tune that new channel (e.g. acquisition of a complete I-frame) can be completed before the next channel-change command is entered. Since fewer steps remain when the command is entered, a repeated or common channel-change command can be completed more quickly than in a conventional receiver.

BRIEF DESCRIPTION OF THE DRAWINGS

Those skilled in the art should be able to understand the invention upon reading the following description in conjunction with the accompanying drawings, in which.

DETAILED DESCRIPTION OF THE DRAWINGS

Figure 1:
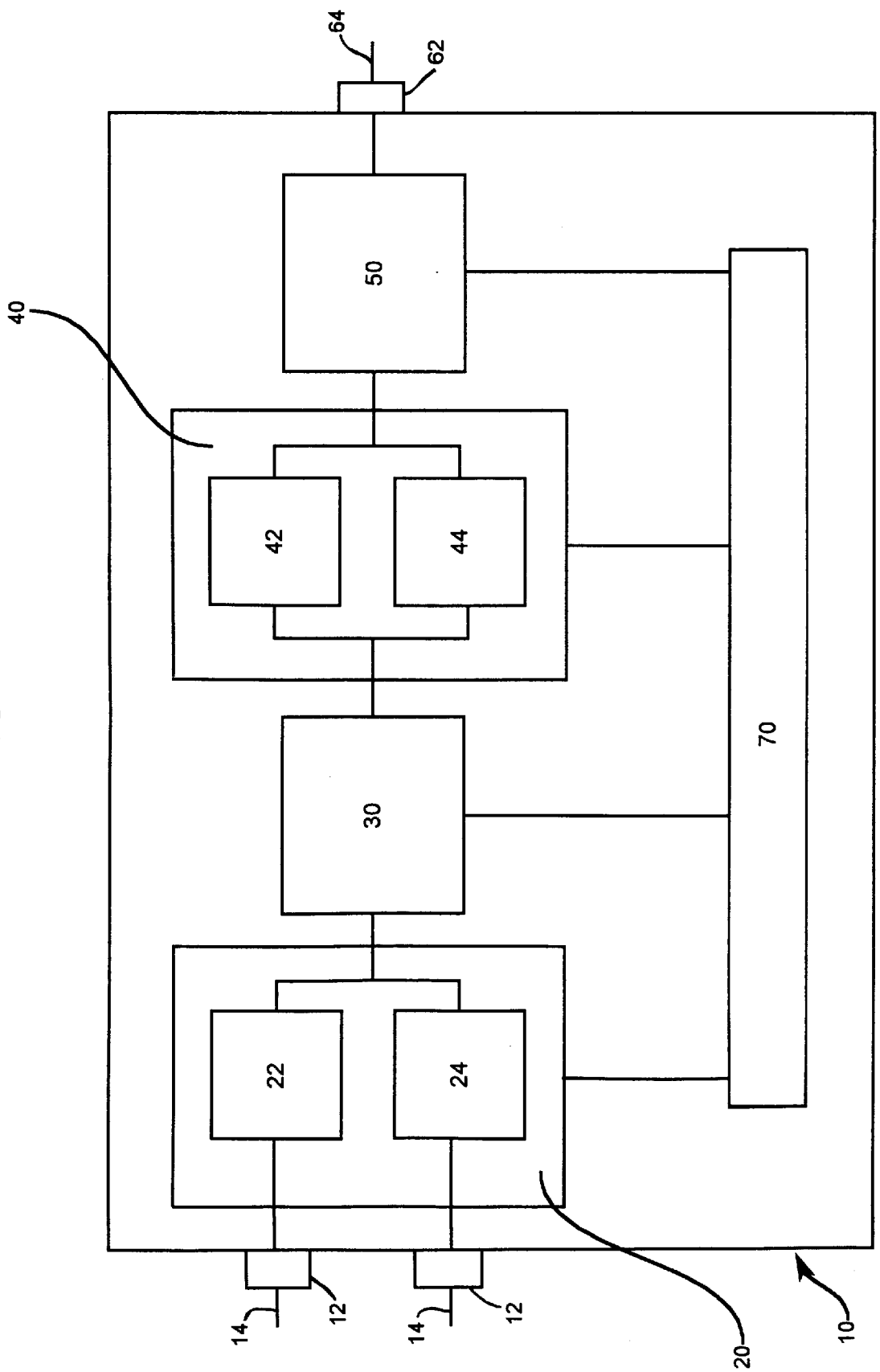
FIG. 1 is a schematic of one embodiment of a DBS receiver in accordance with the present invention.

FIG. 1 illustrates a preferred embodiment comprising a DBS receiver 10 used to process a DBS broadcast transmission. The DBS broadcast transmission, including audio and video information for a range of DBS channels, is received by a satellite antenna (not shown) and fed to the receiver 10 through a suitable number (e.g. a pair) of DBS inputs 12. Each DBS input is preferably a standard RF input that can be readily connected to a coaxial cable 14 from the antenna to receive e.g. an L-band intermediate signal from LNBs located at the antenna. Other transmission or distribution systems may similarly be used (e.g. terrestrial broadcast or cable) without departing from the scope of the present invention.

The DBS broadcast transmission inputted through the DBS inputs 12 is sent to a tuning unit 20 comprised of two tuner modules 22, 24. Each of the tuner modules tunes and demodulates at least a portion of the transmission to produce a set of DBS channel data packets for a different channel. Two L-band inputs are preferably used so that each tuner module may be independently connected to a separate processor in a dual LNB outdoor unit. This allows each tuner module to independently select (via known techniques such as use of variable e.g. 13- or 18- volt dc signals) either left-hand circular polarization (LHCP) signals or right-hand circular polarization (RHCP) signals, as required by the channel to be tuned. In systems utilizing fewer channels or higher capacity cable 14 or other interconnects, a single cable may suffice. In systems where two cables are not sufficient (e.g. where multiple satellites having different locations or frequency bands are utilized) additional cables 14 or other interconnects may be required.

Alternatively, one of the two DBS inputs 12 may be dedicated to a selected signal set (e.g. RHCP or a given satellite location) while the other DBS input is dedicated to another signal set (e.g. LHCP or an alternate satellite location). In such a system, the e.g. RHCP and LHCP transmissions are each delivered to the receiver through its own interconnect, e.g. coaxial cable 14, into a suitable selector switch or multiswitch (not shown) associated with each tuner module. Each tuner module 22 or 24 sends a signal, such as a 13- or 18-volt signal, which its associated switch interprets as a request for either the first or second (or other) signal set (e.g. RHCP or the LHCP signal containing the desired channel). The switch acts upon the signal by connecting the tuner module to the appropriate DBS input having the desired signal set. Using a switch with each tuner module allows the receiver 1 0 to include three or more tuner modules without the need for additional coaxial lines from the receiver to one or more LNB's, and allows use of multiple receivers at a location in conjunction with a single antenna system.

Preferably, each tuner module 22 or 24 includes a QPSK or other demodulator for demodulating the broadcast. Such demodulators are in widespread use in the U.S. in receivers adapted to commercial DBS systems. It is also preferable that each tuner module includes a forward error correction module to correct channel coding errors. The use of such modules is also well-known in the U.S. The tuning unit 20 outputs DBS channel data packets for each of two selected user or DBS channels to a transport circuit 30. In the transport circuit, the data packets are filtered in conventional ways for further processing. Filtering can include, for example, selecting the required data packets in a multi-plexed data stream corresponding to the desired channel, and sending the data packets of one or both of the tuned channels to a conditional access module to assure that access to the content is authorized. Preferably, the audio, video, and data packets are segregated. While the illustrated transport circuit functions the same as a transport circuit in a conventional DBS processor, it preferably has sufficient capacity to handle the additional data packets produced for a second DBS channel. Alternatively, two (or more) transport circuits may be utilized.

The filtered data packets are sent through the transport circuit 30 to a digital video and audio decoding unit 40. The decoding unit includes two separate decoder modules 42, 44. Each decoder module decodes the filtered data packets for one of the tuned DBS channels to provide decoded video, audio, and/or data signals for that tuned channel. This decoding can be done in any conventional way. Preferably, each decoder module includes separate audio, video, and/or data decoders, and decodes the filtered signals in accordance with the MPEG or other applicable standard.

In a preferred embodiment, one set of decoded video, audio, and/or data signals is outputted from the decoding unit 40 to an output stage, such as an analog encoder 50. The encoder processes the decoded signals to produce an appropriate signal for output to a presentation device, such as a television set, video monitor, audio processor, data processor, etc. In certain embodiments, analog video encoding is done by a conventional NTSC encoder. In an all-digital television system, of course, such analog video encoding would be unnecessary. The output signal may be outputted through an output jack 62, such as a conventional RF, S-video, SVGA, or other format of analog or digital output, which can be connected to the presentation device by, e.g., a conventional cable 64. Where the circuits are incorporated within a presentation device, such outputs are optional.

The selection of which DBS channels will be tuned by the tuning unit 20, and which set of decoded video and audio signals will be sent to the encoder 50 for ultimate output to the user's presentation device, are controlled by a microcontroller 70. As described below, the microcontroller is programmed to control the tuning unit so that one tuner module 22 or 24 is tuned to the channel currently selected by the user, and the other tuner module is tuned to a predicted next channel.

The predicted next channel will often be an adjacent channel. "Adjacent", for these purposes, signifies that two channels are consecutive in the list of channels being offered to, or optionally selected by, the user. If, for example, the user is authorized to receive both channels 200 and 201, then those channels are "adjacent." If, on the other hand, the user is authorized to receive channels 200 and 202, but not channel 201, or has selected a user preference list that includes channels 200 and 202 but not channel 201, then channels 200 and 202 are "adjacent."

The microcontroller 70 may predict the next channel based on the last channel-change command. When the user has selected a channel by a channel-up or channel-down command, he or she will often repeat the same command when selecting the next channel to be viewed. Accordingly, when a user enters a channel-up or channel-down command, the microcontroller may be programmed to predict that the next channel-change command will be a repetition of that command. Thus, if the current channel was selected by a "channel-up" command, the microcontroller may be programmed to predict that the next channel requested will be the next adjacent channel above the currently-selected channel. If the currently-selected channel was selected by a "channel-down" command, the microcontroller may be programmed to predict that the next selected channel will be the next adjacent channel below the currently-selected channel.

When a new channel is selected by some other command, the microcontroller may be programmed to predict that the next selected channel will be one of the adjacent channels, the previously-selected channel, or some other channel. It may be advantageous, for example, to program the microcontroller to predict that, when the currently-selected channel was selected by a "previous-channel" command, the next selected channel will be the previously-selected channel, even if that channel is not an adjacent channel.

When a new channel is entered by means of a keypad, the same or a similar algorithm may, in some circumstances, still be applied. If the new channel is an adjacent one, the next channel may still be predicted to be the next sequential channel. Similarly, if the user uses the keypad to enter the same channel that would have been retrieved by a "previous-channel" command, the microcontroller 70 may be programmed to predict that the next channel will be the previously-selected channel.

In some cases, a user may use other techniques to change between two channels of interest. For example, the user may use the channel-up or channel-down commands repeatedly, in rapid succession, to move quickly through the intervening channels. The microcontroller 70 may be programmed to recognize this pattern and discriminate the end points or channel of apparent interest. By way of example, an intervening channel may be ignored if the "dwell" time on that channel is less than a selected minimum, indicating that the intervening channel is not one of interest. A general time window might also be utilized, such that the microcontroller 70 waits a determined time after an initial channel change commands before noting a new channel. In this manner, the system ignores any transient channels within the time window. Other algorithms may also be employed.

The microcontroller 70 can also predict the next channel based on past experience of when the currently-selected channel was previously used (or processed for use). The microcontroller may, for example, apply a stochastic process model such as a Markov chain model for predicting the next channel the user will select. In such a system, the microcontroller could store records of each user's past channel-change commands. Preferably, this information would be stored in non-volatile memory. When any channel is being used, the microcontroller would access the records for channel-changes made when that channel was previously used and determine the probable next channel based on that subset of past channel-change experience.

The prediction of the probable next channel could be made by simply counting the number of times the user switched from the current channel to each possible next channel, and selecting the channel to which the user has in the past most frequently switched. For example, if channel 201 is currently being processed for use and the user has previously switched from that channel to a new channel ten times, the microcontroller can use the records of those ten prior channel-changes to determine the probable next channel. If, in those past experiences with channel 201, the user has switched six times to channel 200, three times to channel 205, and one time to channel 210, the microcontroller can predict from that information that the most probable next channel will be channel 200 (six of ten past events equals a 0.6 probability of a switch to channel 200, versus three of ten past events equals a 0.3 probability of a switch to channel 205, versus a one of ten past events equals a 0.1 probability for a switch to channel 210, versus zero in ten past events equals a 0.0 probability for a switch to any other channel).

Of course, the microcontroller 70 could evaluate this subset of past channel-change experience in different ways to predict the most probable next channel. For example, past experience could be weighted in favor of recent experience so that, in the example stated above, channel 205 might be selected as the most probable next channel if the three switches from channel 201 to 205 happen to be the last three switches that the user made when using channel 201, and were all made during the current period of use.

Of course, the information based on past experience could also supplement (or be supplemented with) other information, such as recent use of the channel-up, channel-down, or previous-channel command, the keypad, or other past channel-change experience.

Figure 2:
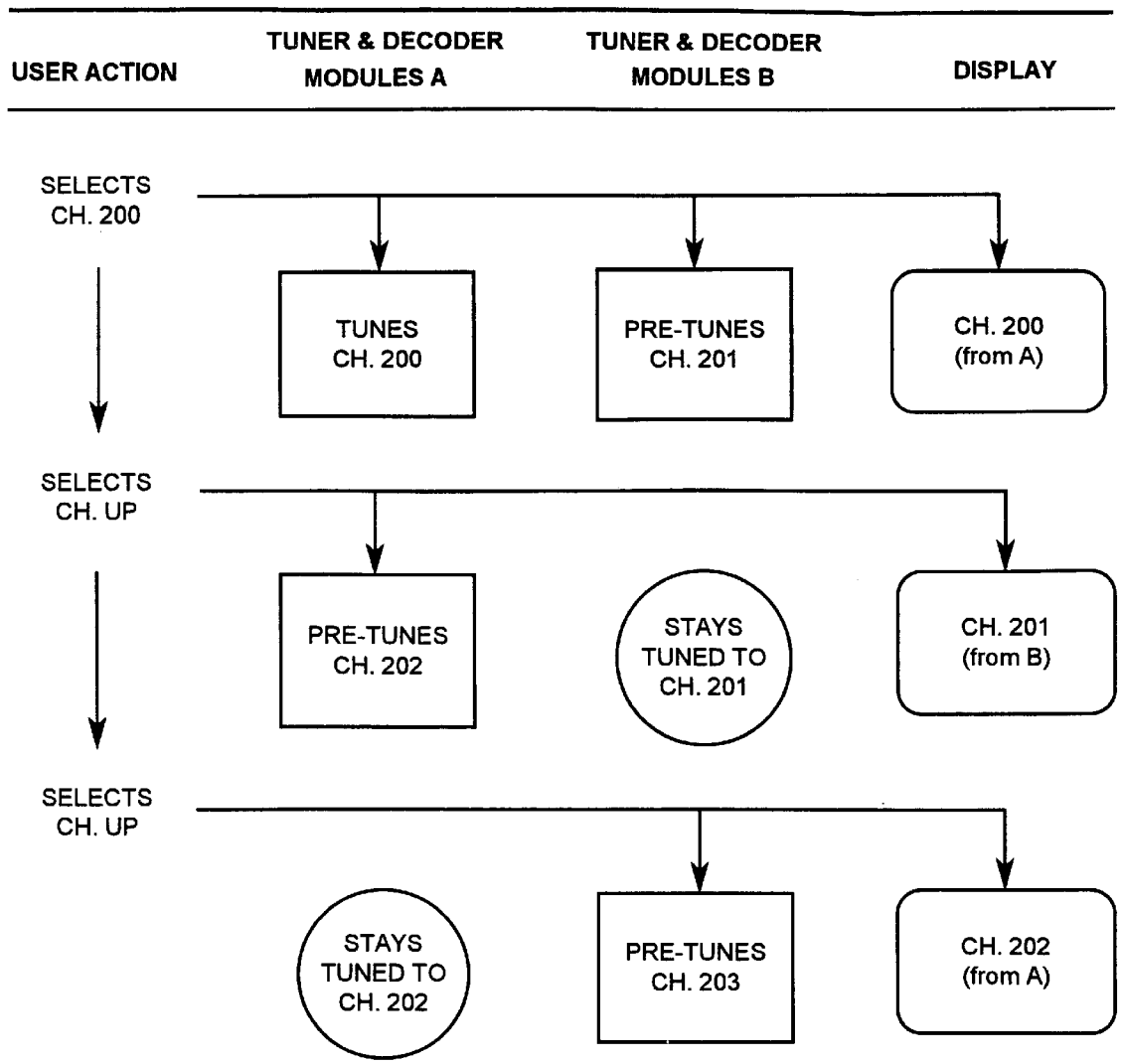
FIG. 2 is a block diagram illustrating operation of the receiver of FIG. 1.

By predicting the next channel and causing one of the tuner modules 22 or 24 to begin tuning to that predicted next channel before a new channel is requested, the microcontroller 70 can enable the receiver 10 to process a repeated or correctly-predicted channel-change command much more quickly than a conventional receiver can. FIG. 2 illustrates this for an embodiment of the invention in which the next channel is predicted based on the user's last channel-change command. It shows a series of user commands and the resulting operations of two sets of tuner and decoder modules A and B. Upon a user's command for channel 200, the microcontroller causes tuner and decoder modules A to tune to channel 200. Once the necessary frequency and polarity have been selected, the transmission has been demodulated, channel coding errors have been corrected, and the resulting data packets have been filtered and decoded to provide decoded video and audio signals, the microcontroller causes the decoded signals to be forwarded to the encoder 50 for processing for output to a user's television set.

As illustrated, the user next enters a channel-up command. In a conventional DBS receiver, this request for a new channel would require a re-initiation of the same steps described above. In the illustrated receiver 10, however, decoded signals for the newly-selected channel 201 are already available through decoder module B. While the tuner and decoder modules A were tuning to channel 200, the microcontroller 70 predicted that the next channel the user would select would be channel 201. Accordingly, it caused tuner module B to begin tuning to that channel. While data packets for channel 200 were being filtered and sent to decoder module A, data packets for channel 201 were being filtered and sent to decoder module B. Decoder module B began decoding the signals for channel 201 while decoder module A decoded the signals for channel 200. Thus, when the user selected channel 201, all that the receiver 10 needed to do to complete the channel change was to confirm that the newly selected channel was the predicted channel being processed by the other tuner/decoder, send the signals from decoder module B to the encoder 50, encode the signals, and send them to the user's television set. As a result, response to the user's request for a new channel was significantly improved.

In this embodiment of the invention, the user's selection of channel 201 by a channel-up command also causes the microcontroller 70 to predict that the next channel selected will be channel 202. (If the user is not authorized to receive channel 202, or if the user has selected a preference list that does not include channel 202, the microcontroller would predict that the next channel would be the next-higher channel on the user's preference list that the user is authorized to receive.) The microcontroller causes tuner module A to begin tuning to that next-predicted channel. When the user subsequently repeats the channel-up command, the change to channel 202 (or to the next appropriate channel) can again be completed much more quickly than in a conventional receiver.

With the illustrated receiver 10, improved channel-change response is available only if a user selects the predicted next channel; that is, if the microcontroller was "correct" in predicting the next channel. However, even if the user selects a new channel that is not the predicted new channel (i.e., the prediction was "wrong"), the channel change can still be completed as quickly as in a conventional receiver.

Figure 3:
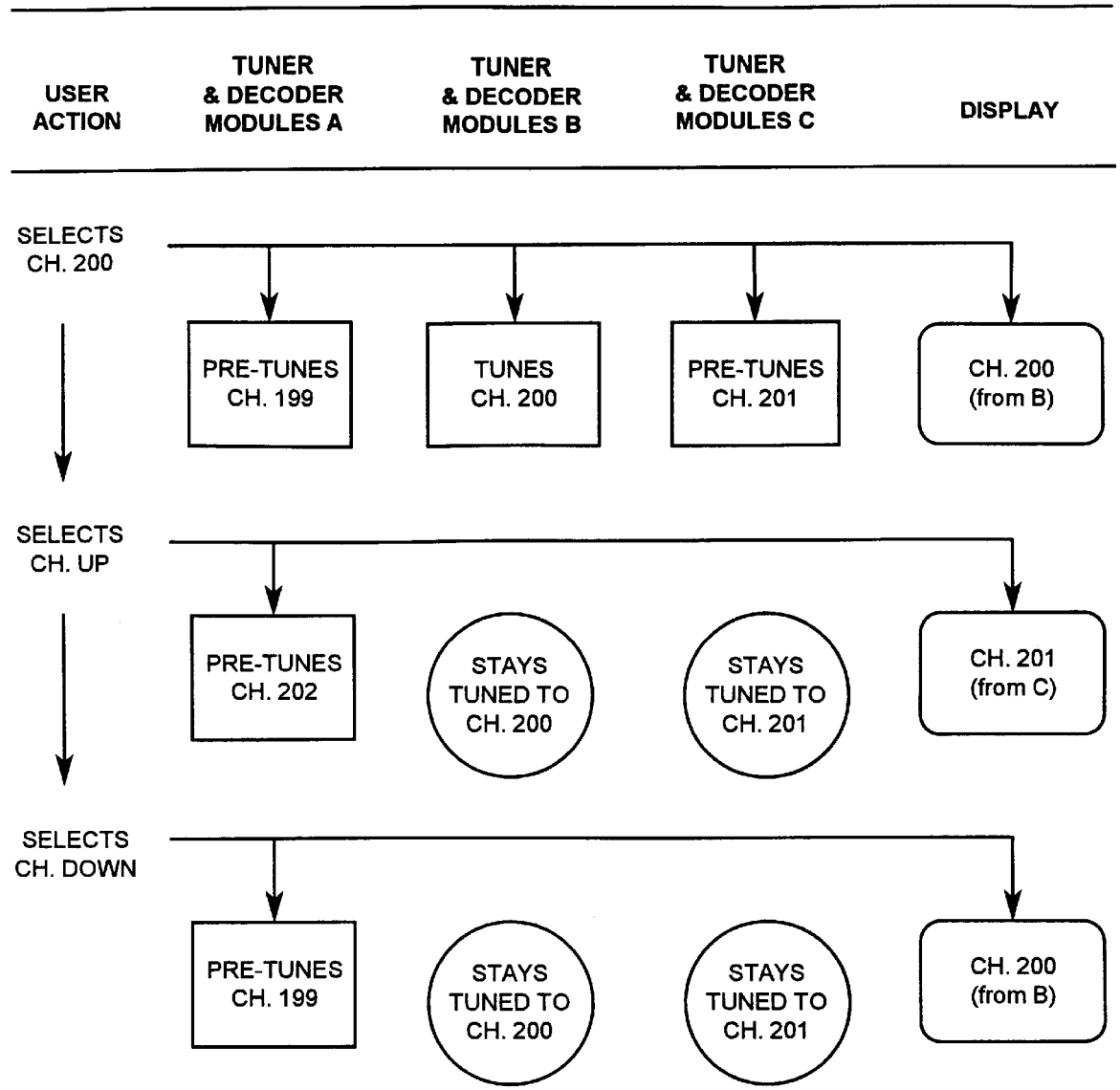
FIG. 3 is a block diagram illustrating operation of an alternate embodiment of a receiver in accordance with the invention.

FIG. 3 illustrates one way in which the inclusion of a third tuner module and a third decoder unit can be used to improve channel-change response even when a user does not repeat his or her last channel-change command. As illustrated, the user's selection of channel 200 causes tuner module B to begin tuning to channel 200. Meanwhile, the microcontroller 70 predicts that the next channel will be one of the two adjacent channels and causes tuner modules A and C begin tuning to channels 199 and 200, respectively.

When the user subsequently enters a channel-up command, the microcontroller 70 causes the signals from the tuner and decoder modules C to be sent to the encoder 50 while tuner modules A and B re-tune to the next channels above and below the newly-selected channel. As illustrated, the tuner module that is already tuned to previously-selected channel 200 (tuner module B) remains tuned to that channel, while the other tuner module (tuner module A) re-tunes from channel 199 to channel 202. In this way, the re-tuning of the tuning unit 20 requires only one tuner module to be re-tuned. While benefits of the invention could be derived from re-tuning tuner module A to channel 200 and re-tuning tuner module B to channel 202, programming the microcontroller to leave tuner module B tuned to the previously-selected channel may allow an even quicker channel change in some circumstances.

After the channel is changed to channel 201, the user makes a channel-down or previous-channel command. Because tuner module B remained tuned to channel 200, the channel-change command can be processed quicker than in a conventional DBS receiver, even though the channel-change command was not a repetition of the user's last channel-change command.

A third tuner module can also be useful in a system that predicts the next channel based on past channel-changing experience. In such a system, the third tuner module can be programmed to begin tuning to the second-most-probable next channel. Preferably, the second-most-probable next channel would be determined by the same routine or formula used to determine the most probable next channel. In specific embodiments, one tuner may always remain tuned to the last-tuned channel (in the event of a "previous channel" command), while the other tunes to a channel predicted by any of the described or other predictive algorithms or logic.

Selection or control of the mode of multi-tuner predictive functions may be pre-set, or may be user selectable. For example, user inputs (via switches, keypad, remote control, menu selections, or otherwise) may be provided to allow a user to input preference information, such as selecting a "simple" operation limited to channel-up, channel-down, or previous-channel predictions, or an "advanced" operation including more complex stochastic or other techniques. Other preference information may be used to "fine-tune" the predictive algorithms to best match the user's frequency and use patterns. Different preferred modes of operation may be employed for different users of the system and stored for retrieval and use when that user is commanding the system (e.g. in a user profile maintained for other purposes by the receiver 10). Thus the device may be configurable if desired to achieve a high degree of predictive accuracy for one or more given user(s).

Benefits of the present invention are achieved as described by providing two or more tuner/decoder sections, feeding (selectively) an output stage. If desired, multiple output stages can also be provided, such that the next-predicted signal(s) is also processed as required (e.g. NTSC encoded) for immediate display or use as requested. In such embodiments, switching between present and selected next channel outputs is done on the output-ready signals. In this manner, delays in the output stage processing are also avoided.

Where multiple output stages are also provided, the device may further be configured to make the two (or more) output signals available for simultaneous display, e.g. at second outputs or internally as PIP or other multi-view features. In such embodiments, the user may view or otherwise process (e.g. in picture-in picture (PIP) or other multi-view format of a single display, or on multiple display devices) both the selected channel and the next-predicted channel(s). This may further facilitate normal "surfing", and allows the viewer to watch or otherwise use two channels (e.g. when changing between two programs of interest by using "previous program" or other selection methods, and monitoring the alternate program by PIP or other methods). Further, by combining such embodiments with further user control options, the device may be optionally configured by the user to utilize at least a second of the two-or-more tuner/demodulator/output stage circuits to process a user-selected second channel not utilizing the predictive features discussed. Thus the device can support flexible and fast channel-changing in a normal mode as described, and in a second mode output a selected second channel when desired (e.g. to allow watching of one program while recording another, PIP operation, second set operation, or otherwise).

Of course, it should be understood that a wide range of other changes, modifications, and improvements can be made to the preferred embodiment described above. It is therefore intended that the foregoing detailed description be regarded as illustrative rather than limiting, and it should be understood that it is the following claims, including all equivalents, that are intended to define the scope of the invention.

What is claimed is:

1. A multi-channel digital video transmission receiver comprising:

tuning and decoding units capable of tuning and decoding a digital transmission to simultaneously produce a set of decoded digital video signals for each of two or more tuned channels;

a microcontroller programmed to respond to a user's request for a selected one of the two or more tuned channels by causing the set of signals for the selected channel to be outputted, predicting a next channel, and causing a second tuning unit to begin tuning the predicted next channel in addition to the selected channel.

2. The receiver of claim 1, further comprising an analog encoder capable of encoding at least those signals corresponding to the selected channel for output to a presentation device.

3. The receiver of claim 1, in which the microcontroller is programmed to predict that the next channel will be a channel adjacent to the selected channel.

4. The receiver of claim 1, in which a user's request for the selected channel by a channel-up command causes the microcontroller to predict that the next channel will be the adjacent channel above the selected channel, and selection of the selected channel by a channel-down command causes the microcontroller to predict that the next channel will be the adjacent channel below the selected channel.

5. The receiver of claim 1, in which a user's request for the selected channel by a previous-channel command causes the microcontroller to predict that the next channel will be the previously-selected channel.

6. The receiver of claim 1, in which the microcontroller predicts the next channel based on past experience related to when the selected channel was previously processed for use.

7. The receiver of claim 6, in which the microcontroller predicts the next channel based on which channel has been most frequently selected as the next channel when the current channel was previously processed for use.

8. The receiver of claim 6, in which the microcontroller predicts the next channel using a stochastic process model.

9. The receiver of claim 1, in which the tuning unit comprises two tuner modules, each tuner module being capable of producing channel data packets for a different tuned channel.

10. The receiver of claim 1, in which the tuning and decoding units are capable of simultaneously producing decoded signals for each of at least three tuned channels.

11. The receiver of claim 1, in which:

the tuning unit comprises at least three tuner modules, each tuner module being capable of producing channel data packets for a different tuned channel; and upon a channel-up or channel-down command, one of the tuner modules remains tuned to the previously-selected channel.

12. The receiver of claim 1, in which:

the tuning unit comprises three tuner modules, each tuner module being capable of producing channel data packets for a different tuned channel; and the microcontroller can respond to a request for a selected channel by causing tuner modules not tuned to the selected channel to begin tuning to the adjacent channels above and/or below the selected channel.

13. The receiver of claim 1, in which:

the tuning unit comprises three tuner modules, each tuner module being capable of producing channel data packets for a different tuned channel; and the microcontroller attempts to predict the next channel based on past experience related to when the selected channel was previously processed for use, and causes tuner modules not tuned to the selected channel to begin tuning to the two most probable next channels.

14. The receiver of claim 1, further comprising a user input permitting a user to input preference information that is used in selecting or developing an algorithm to be used in making next-channel predictions.

15. The receiver of claim 1, further comprising means of maintaining separate user profiles, each user profile utilizing a user-specific algorithm or set of algorithms for predicting a next channel when that user is using the receiver.

16. The receiver of claim 1, further comprising:

a first output stage for processing the signals for the selected channel for output; and a second output stage for processing the signals for another channel for output.

17. The receiver of claim 1, further comprising:

a first output stage for processing the signals for the selected channel for output;

a second output stage for processing the signals for another channel for output; and means for allowing the user to simultaneously display the processed signals from both output stages.

18. The receiver of claim 1 in which the multi-channel digital video transmission comprises a direct broadcast satellite (DBS) broadcast.

19. A method for providing prompt response to a user's request for a selected digital video channel in a multi-channel digital video transmission, the method comprising the steps of:

tuning to and decoding a digital video transmission to simultaneously produce decoded digital video signals for each of at least two tuned channels; and upon a user's request for one of the tuned channels as the selected new channel, processing the signals for the selected channel for use, making a prediction of the next channel the user will request, and commencing to decode signals for the predicted next channel while continuing to decode signals for the selected channel.

20. The method of claim 19, in which the signals processed for use are encoded for display on an analog-based system.

21. The method of claim 19, in which the predicted next channel can be a channel adjacent to the selected channel.

22. The method of claim 19, in which the predicted next channel can be the adjacent channel above the selected channel if the selected channel is requested by a channel-up command, and can be the adjacent channel below the selected channel if the selected channel is requested by a channel-down command.

23. The method of claim 19, in which the prediction of the next channel is based on past experience related to when the selected channel was previously processed for use.

24. The method of claim 19, in which the prediction of the next channel is made using a stochastic process model.

25. The method of claim 19, in which:

the broadcast is tuned and decoded to simultaneously produce decoded signals for each of at least three tuned channels; and upon a user's request for the selected channel, producing decoded signals for both the selected channel and at least one of the adjacent channels above and below the selected channel.

26. The method of claim 19, in which:

the broadcast is tuned to simultaneously produce decoded signals for each of at least three tuned channels; and upon a user's request for a selected channel, production of decoded signals for the previously-selected channel continues.

27. The method of claim 19, in which:

the broadcast is tuned and decoded to simultaneously produce decoded signals for each of at least three tuned channels; and upon a user's request for the selected channel, the prediction of the next channel is made based on past experience related to when the selected channel was previously processed for use, and decoding of signals for the two most probable next channels commences.

28. The method of claim 19 in which the multi-channel digital video transmission comprises a direct broadcast satellite (DBS) broadcast.

* * * * *